US008861343B2

(12) United States Patent
Yang et al.

(10) Patent No.: US 8,861,343 B2
(45) Date of Patent: Oct. 14, 2014

(54) METHOD AND SYSTEM FOR SCHEDULING OF BASE STATION FOR HSUPA

(75) Inventors: Tao Yang, Shanghai (CN); Ning Lu, Shanghai (CN); Xueqing Zhu, Shanghai (CN); Mingli You, Shanghai (CN); Zhigang Luo, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1822 days.

(21) Appl. No.: 11/346,471

(22) Filed: Feb. 3, 2006

(65) Prior Publication Data

US 2006/0176811 A1    Aug. 10, 2006

(30) Foreign Application Priority Data

Feb. 7, 2005  (CN) .......................... 2005 1 0023902

(51) Int. Cl.
*H04W 72/12*        (2009.01)
(52) U.S. Cl.
CPC ................................ *H04W 72/1278* (2013.01)
USPC .......................................................... 370/229
(58) Field of Classification Search
USPC ................... 455/522; 370/329, 319, 348, 347, 370/395.4, 95
See application file for complete search history.

(56) References Cited

U.S. PATENT DOCUMENTS

| 6,295,453 | B1 * | 9/2001 | Desgagne et al. ............ 455/448 |
| 7,321,780 | B2 * | 1/2008 | Love et al. .................... 455/522 |
| 2001/0032262 | A1 | 10/2001 | Sundqvist |
| 2003/0133415 | A1 | 7/2003 | Kim |
| 2003/0232624 | A1 | 12/2003 | Toskala et al. |
| 2004/0192208 | A1 | 9/2004 | Kong |
| 2004/0218829 | A1 | 11/2004 | Lee et al. |
| 2004/0219920 | A1 | 11/2004 | Love et al. |
| 2004/0223507 | A1 * | 11/2004 | Kuchibhotla et al. ......... 370/428 |

(Continued)

OTHER PUBLICATIONS

Non-Patent Literature 3GPP TS 25.321 v6.3.0 published Dec. 2004. See whole Document.*

(Continued)

*Primary Examiner* — Hassan Phillips
*Assistant Examiner* — Omeed D Rahgozar
(74) *Attorney, Agent, or Firm* — Fay Sharpe LLP

(57) ABSTRACT

Method and system for scheduling of a base station for HSUPA is provided. The method for scheduling of base station includes a method for scheduling of serving base station and a method for scheduling of non-serving base station, in which the method for scheduling of the serving base station comprises the base station generating a scheduling grant based on scheduling information SI and a happy bit transmitted from a terminal and based on a currently measured interference value, a configured threshold and associated resource information. The method for scheduling of the non serving base station comprises the base station generating a scheduling grant based on a currently measured interference value, a configured threshold and associated resource information. The system for scheduling of a base station comprises a transmitting module is used by the terminal for transmitting information to the base station; a configuration module is used by the SRNC for configuring parameters of associated threshold to the base station; a measurement module is used by the base station for measuring current interference; a calculation module is used by the base station for performing scheduling based on the current-obtained information. The present invention has solved the problem in scheduling of the base station for resources among terminals, which achieves the object of enhancing performance of uplink in a system and improving experience for users and has an important effect on HSUPA normalization process.

18 Claims, 3 Drawing Sheets

(56) References Cited

U.S. PATENT DOCUMENTS

| | | | | |
|---|---|---|---|---|
| 2005/0002368 | A1* | 1/2005 | Kwon et al. | 370/342 |
| 2005/0243768 | A1* | 11/2005 | Terry et al. | 370/329 |
| 2006/0056355 | A1* | 3/2006 | Love et al. | 370/332 |
| 2006/0104240 | A1* | 5/2006 | Sebire et al. | 370/329 |
| 2006/0159013 | A1* | 7/2006 | Lee et al. | 370/229 |
| 2006/0159016 | A1* | 7/2006 | Sagfors et al. | 370/230 |
| 2008/0170504 | A1* | 7/2008 | Petrovic et al. | 370/235 |

OTHER PUBLICATIONS

Non-Patent Literature "CRs on TR 25.309 on Enhanced Uplink" published Dec. 2004. See Whole Document.*

Non-Patent Literature EUL scheduling signaling support published by Samsung on Sep. 2004. See whole document.*

Non-Patent Literature "Reverse-Link Control Mechanisms in CDMA2000 Revision D: Performance Evaluation" by Avinash et al. (hereinafter Avinash) published 2004.*

Ghosh et al, "Overview of enhanced uplink for 3GPP W-CDMA", Vehicular Technology Conference, 2004. VTC 2004—Spring. 2004 IEEE $59^{TH}$ Milan, Italy, May 17-19, 2004, Piscataway, NJ, USA, IEEE May 17, 2004, pp. 2261-2265, XP010766561.

U.S. Appl. No. 11/346,197, filed Feb. 3, 2006, entitled "Service Admission Control Algorithm for HSUPA and Apparatus Thereof".

Jain Avinash et al, "Reverse-link control mechanisms in CDMA2000 revision D: performance evaluation", Personal, Indoor and Mobile Radio Communications, 2004. PIMRC 2004. $15^{th}$ IEEE International Symposium, Barcelona, Spain, Sep. 5-8, 2004, IEEE, vol. 3, Sep. 5, 2004, pp. 204-2045 XP010754291.

"Universal Mobile Telecommunications System (UMTS); Multiplexing and channel coding (FDD) (3GPP TS 25.212 version 6.3.0 Release 6); ETSI; TS 125 212", ETSI Standards, European Telecommunications Standards Institute, Sphia-antip., FR. vol. 3-RI, No. V630, Dec. 2004, XP014027617.

A. Ghosh et al, "Overview of enhanced uplink for 3GPP W-CDMA", Vehicular Technology Conference, 2004, vgc 2004—Spring. 2004 IEEE $59^{TH}$—Milan, Italy, May 17-29, 2004, Piscataway, NJ, USA, IEEE, May 17, 2004, pp. 2261-2265, XP010766561.

"Uplink Signalling for Node B Scheduling", Nokia, 3GPP TSG-RAN WG1 Ad Hoc Meeting, Espoo, Finland, Jan. 27-30, 2004.

* cited by examiner

METHOD AND SYSTEM FOR SCHEDULING OF BASE STATION FOR HSUPA

CROSS-REFERENCE TO RELATED APPLICATIONS

This application is entitled to the benefit of Chinese Patent Application No. CN 200510023902.8 filed on Feb. 7, 2005 with the Chinese Patent Office.

FIELD OF THE INVENTION

The present invention relates to 3G (the 3rd Generation) wireless mobile communication field, particularly to method and system for scheduling of base station for HSUPA.

PRIOR ART

As an enhanced uplink technique of 3G, HSUPA is mainly used to enhance performance of uplink in a system and improve experience for users. In order to achieve the object, some new techniques are used in transmission of High Speed Uplink Packet Access (HSUPA), such as scheduling policy with Node B (Base Station) and etc., so that new processing and corresponding uplink and downlink signaling are introduced into the base station and the terminals to support the policy so as to achieve the object of enhancing uplink performance of system.

In HSUPA, a basic process for scheduling of base station is: the base station generating and transmitting a downlink signal to the terminal based on associated uplink information, and the terminal performing correct data transmission based on a downlink scheduling signaling.

In a HSUPA transmission process, the terminal reports its state to the base station according to a certain rule (e.g. in periodicity or event triggering mode), and transmits a happy bit for current occupied resources by the terminal on a signaling channel in each transmission period. Meanwhile, the base station makes measure for current interferences in each transmission period. Finally, the base station implements a scheduling process for resources among terminals based on the information.

Uplink signaling of HSUPA associated with the scheduling process mainly includes:

Scheduling Information (SI) transmitted in an Enhanced Dedicated Purpose Data Channel (E-DPDCH);

Happy bit transmitted in an Enhanced Dedicated Purpose Control Channel (E-DPCCH) discussed at present;

Downlink signaling associated with the scheduling process mainly includes:

Absolute Grant (AG) for indicating upper limit of available resources for a terminal user;

Relative Grant (RG) for adjusting user resources step by step.

For a HSUPA transmission process in a SHO (Soft Hand-Over) state, there are the following provisions in 3GPP:

SI is only transmitted to a serving base station;

Transmission mode of SI can be in periodicity or event triggering mode;

Scheduling grants generated by the serving base station include AG and RG;

Non-serving base station only generates RG;

AG is used for limiting upper limit of available resources for a terminal user;

RG is applied to actual used resources of a user;

RG of non-serving base station only relates to current interference

The effects of AG of serving base station and RG of non-serving base station are the same, i.e. to be applied to actual usage for resources of a user.

However, in order to implement a HSUPA transmission process, there exists the following important problems which can not be solved:

1) How does the serving base station generate AG indicating upper limit of available resources for a user?

2) How does the serving base station generate RG to be applied to actual usage for resources of a terminal user?

3) How does the non-serving base station generate RG to be applied to actual usage for resources of a terminal user based on current interferences?

4) What is relationship between scheduling process of base station and HARQ processing?

A proper solution directed to the above problems is significant for optimizing HSUPA transmission and is necessary for normalization process of 3GPP HSUPA, but it is a problem to be solved how a base station performs scheduling for resources among terminals based on uplink information.

The present invention is directed to corresponding solution to the above problems and has a significant effect on normalization process of HSUPA.

SUMMARY OF THE INVENTION

The object of the present invention is to provide method and system for scheduling of base station for HSUPA in order to enhance performance of uplink in a system and improve experience for users.

The present invention provides a method for scheduling of a serving base station for HSUPA, characterized in the base station generating a scheduling grant based on scheduling information SI and a happy bit transmitted from a terminal and based on a currently measured interference value, a configured threshold and associated resource information.

In the above method for scheduling of a serving base station for HSUPA, when the serving base station receives the SI and the configured associated resource information is that no E-RGCH is configured for a cell, the generated scheduling grant is an Absolute Grant (AG).

In the above method for scheduling of a serving base station for HSUPA, when the serving base station receives the SI and the configured associated resource information is that an E-RGCH is configured for a cell, the generated scheduling grant is one of an Absolute Grant (AG) and a Relative Grant (RG).

In the above method for scheduling of a serving base station for HSUPA, when $|E_t| \geq E$, the serving base station generates an AG; otherwise, the serving base station generates a RG; wherein E is the parameter of the base station configured threshold, Et is the dynamic control variable, $E_t = T_{current} - T_{target}$, $T_{target}$ is the resources required for a user generated based on the SI, the interference, the happy bit of the terminal user, $T_{current}$ is the current-used resources of the terminal user obtained from transmission format information.

In the above method for scheduling of a serving base station for HSUPA, when the serving base station does not receive the SI and the configured associated resource information is that no E-RGCH is configured for a cell, the generated scheduling grant is an Absolute Grant (AG) or no scheduling grant is generated.

In the above method for scheduling of a serving base station for HSUPA, when the serving base station does not receive the SI and the configured associated resource information is that an E-RGCH is configured for a cell, the generated scheduling grant is a RG.

In the above method for scheduling of a serving base station for HSUPA, when information represented by the happy bit of the terminal user is inconsistent with the interference information of the serving base station, the priority of the interference information is higher than the information represented by the happy bit of the user.

The present invention further provides a method for scheduling of a serving base station for HSUPA, characterized in the base station generating a scheduling grant based on scheduling information SI transmitted from a terminal and based on a currently measured interference value, a configured threshold and associated resource information.

In the above method for scheduling of a serving base station for HSUPA, when the serving base station receives the SI and the configured associated resource information is that no E-RGCH is configured for a cell, the generated scheduling grant is an AG.

In the above method for scheduling of a serving base station for HSUPA, when the serving base station receives the SI and the configured associated resource information is that an E-RGCH is configured for a cell, the generated scheduling grant is one of an AG and a RG.

In the above method for scheduling of a serving base station for HSUPA, when $|E_t| \geq E$, the serving base station generates an AG; otherwise, the serving base station generates a RG; wherein E is the parameter of base station configured threshold, Et is the dynamic control variable, $E_t = T_{current} - T_{target}$, $T_{target}$ is the resources required for a user generated based on the SI and the interference, $T_{current}$ is the current-used resources of the terminal user obtained from transmission format information.

In the above method for scheduling of a serving base station for HSUPA, when the serving base station does not receive the SI and the configured associated resource information is that an E-RGCH is configured for a cell, the generated scheduling grant is a RG.

The present invention further provides a method for scheduling of a non-serving base station for HSUPA, characterized in the base station generating a scheduling grant based on a currently measured interference value, a configured threshold and associated resource information.

In the above method for scheduling of a serving base station for HSUPA, when the configured associated resource information is that no E-RGCH is configured for a cell, no scheduling grant is generated.

In the above method for scheduling of a serving base station for HSUPA, when the configured associated resource information is that an E-RGCH is configured for a cell, the generated scheduling grant is a RG.

The present invention further provides a system for scheduling of a base station for HSUPA, characterized in that the system comprises a transmitting module in a terminal, a configuration module in a SRNC and a measurement module and a calculation module in a base station, wherein the calculation module is connected to the transmitting module, the configuration module and the measurement module respectively, the transmitting module is used by the terminal for transmitting information to the base station; the configuration module is used by the SRNC for configuring parameters of associated threshold to the base station; the measurement module is used by the base station for measuring current interference; the calculation module is used by the base station for performing scheduling based on the current-obtained information.

Using the above technical solution, i.e. by the method for generating Relative Grant $RG_{S/N}$ proposed by the present invention, the Serving Radio Network Controller (SRNC) configures parameters of associated threshold based on current network status, the serving base station generates $RG_S$ based on these parameters in combination with current interference and the happy bit of the terminal user, the non-serving base station generates $RG_{N/S}$ based on these parameters and current interference, so that scheduling for resources among the terminals is implemented to achieve the object of enhancing performance of uplink in a system and improving experience for users and to have an important effect on HSUPA normalization process.

DETAILED DESCRIPTION OF THE INVENTION

Figure 1:
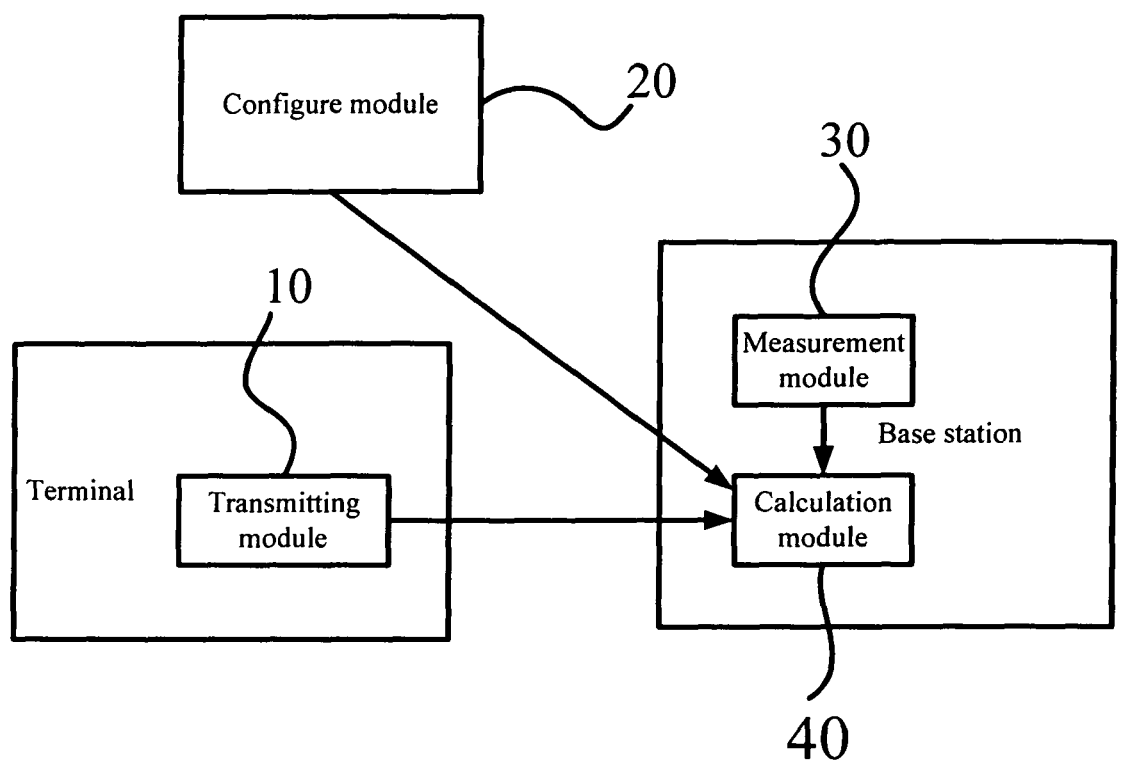
FIG. 1 is a structure schematic diagram of an apparatus for scheduling of base station of the present invention.

To facilitate the following discussion, symbols are defined and used as follows: AG: Absolute Grant generated by a serving base station; $RG_S$: Relative Grant generated by a serving base station; $RG_N$: Relative Grant generated by a non-serving base station; ROT: Rise Over Noise (interference); SI: Scheduling Information.

The present invention has proposed a complete solution of the existing base station scheduling for resources among terminal based on uplink information according to features of HSUPA and definitions to AG, $RG_S$, $RG_N$ in combination with associated decisions of 3GPP.

I. For $RG_S$ (1) SI represents requirements for resources of a user, and the serving base station shall respond to the user on the requirements based on SI, so SI is a first one of mechanisms for triggering generation of $RG_S$.

(2) 3GPP has defined that $RG_S$ is generated based on a current ROT of the base station, in consideration that $RG_N$ and $RG_S$ have the same function: to be applied to actual used resources by a terminal user. Therefore, a second one of mechanisms for generation of $RG_S$ shall be based on a current ROT of the serving base station.

(3) 3GPP RAN2 conference is discussing that 1 bit of Happy bit is transmitted on an E-DPCCH as a simple representation of happy level for current transmission resources of the terminal user at present. This bit information is transmitted on the E-DPCCH, so both the serving base station and the non-serving base station can receive the bit information. However, the non-serving base station only makes corresponding instructions based on current ROT, and the Relative scheduling Grant ($RG_N$) can only have a negative effect on resources available to the terminal user ($RG_N$=DOWN/Don't Care). Also, there are two cases for processing for Happy Bit: the user is satisfied with current resources; the user is not satisfied with current resources. Therefore, the non-serving base station does not respond to the bit information, but the scheduling for the terminal by the serving base station contains two aspects, negative and positive:

Positive response: transmitting a new AG to indicate a larger upper limit of resources or $RG_S$=UP Negative response: transmitting a new AG to indicate a smaller upper limit of resources or $RG_S$=DOWN/HOLD Therefore, if the Happy Bit is admitted by 3GPP, the serving base station responds to the bit information. Since information carried in 1 bit of Happy bit is limited, the serving base station can only generate a Relative Grant based on the bit information. That is, Happy Bit is a third one of mechanisms for generation of $RG_S$.

In addition, it only has an effect on transmission quality of a single user whether the terminal user is satisfied with current resources, and ROT will have a significant effect on transmission quality of all terminal users controlled by Node B. Therefore, if information represented by the Happy Bit of the terminal user is inconsistent with ROT information of the serving Node B, the priority of ROT will higher than that of information represented by the Happy Bit of the user.

Summing up the above, three types of information shall be considered at the same time for generation of $RG_S$:

SI;

ROT information of the serving base station;

Happy bit information of UE;

At the same time, it shall be considered that the transmission of SI is in periodically and event-triggered, i.e. Node B can not obtain SI information for all TTIs, and the ROT information and the Happy bit information exist for each TTI.

II. For AG:

3GPP has prescribed that Scheduling Information SI is transmitted to a serving base station in MAC-e packet according to requirement so that the serving base station performs scheduling on resources available to a terminal user. Since the SI contains much information and the serving base station can properly allocate resources among different users, the serving base station can generate an AG based on SI, current-measured interference information, Happy bit information of the terminal and etc.

III. The Scheduling Process of Base Station is Divided into Scheduling Process of a Serving Base Station and Scheduling Process of a Non-Serving Base Station.

III(A). The Scheduling Process of a Serving Base Station: Generation of AG, $RG_S$ 3a.1 The Scheduling Process of a Serving Base Station Which Receives SI from a Terminal Referring to FIG. 2, scheduling information from the terminal is transmitted according to requirement, and interference measurement information ROT and Happy bit information from the terminal are available in each transmission period. For this feature, if the serving base station receives scheduling information from the terminal at a certain scheduling time, it properly allocates resources among users using a certain rule based on the SI, current ROT measurement information from each user and Happy bit from the terminal user to enhance performance of uplink in a system and improve experience for users.

The serving base station generates different grants based on different configurations of cells.

3a.11 The Case that no E-RGCH (Enhanced-Relative Grant Channel) is Configured for the Serving Cell SRNC make a determination whether it assigns E-RGCH for transmitting RG grant to the cell based on results of network planning, so there are some cells having E-RGCH and some having no E-RGCH configured, but it is certain that E-AGCH is configured. For this feature, if no E-RGCH is configured for the cell, the serving base station only generates AG based on SI, current ROT information and Happy bit of each UE (if the Happy bit information is admitted by 3GPP, the information is considered, otherwise it is not considered), which is transmitted to each terminal by E-AGCH.

3a.12 The Case that E-RGCH Channel is Configured for the Serving Cell

SRNC make a determination whether it assigns E-RGCH for transmitting RG grant to the cell based on results of network planning, so there are some cells having E-RGCH and some having no E-RGCH configured, but it is certain that E-AGCH is configured. For this feature, if an E-RGCH is configured for the cell, the serving base station switches between AG and $RG_S$, generates and transmits one of AG and $RG_S$ to the terminal through a corresponding channel based on a certain rule and corresponding scheduling information:

if an AG is generated, it is transmitted to the terminal through an E-AGCH;

if an $RG_S$ is generated, it is transmitted to the terminal through an E-RGCH.

In order to implement selection between AG and $RG_S$, the SRNC configures a parameter of threshold E for the base station. The serving base station generated resources required for the user $T_{target}$ based on the above SI, ROT, Happy bit information of the terminal user (if the Happy bit information is admitted by 3GPP, the information is considered, otherwise it is not considered) and etc, and obtains actual current-used resources of the terminal user by transmission format information. A dynamic control variable Et is defined as:

$$E_t = T_{current} - T_{target}$$

and then selection decision algorithm is as follows:

if $|E_t| \geq E$ then the serving base station generated AG and transmits it to UE through E-AGCH, else the serving base station generates RG and transmits it through E-RGCH end if wherein the parameter of threshold E can be reconfigured by SRNC.

Figure 2:
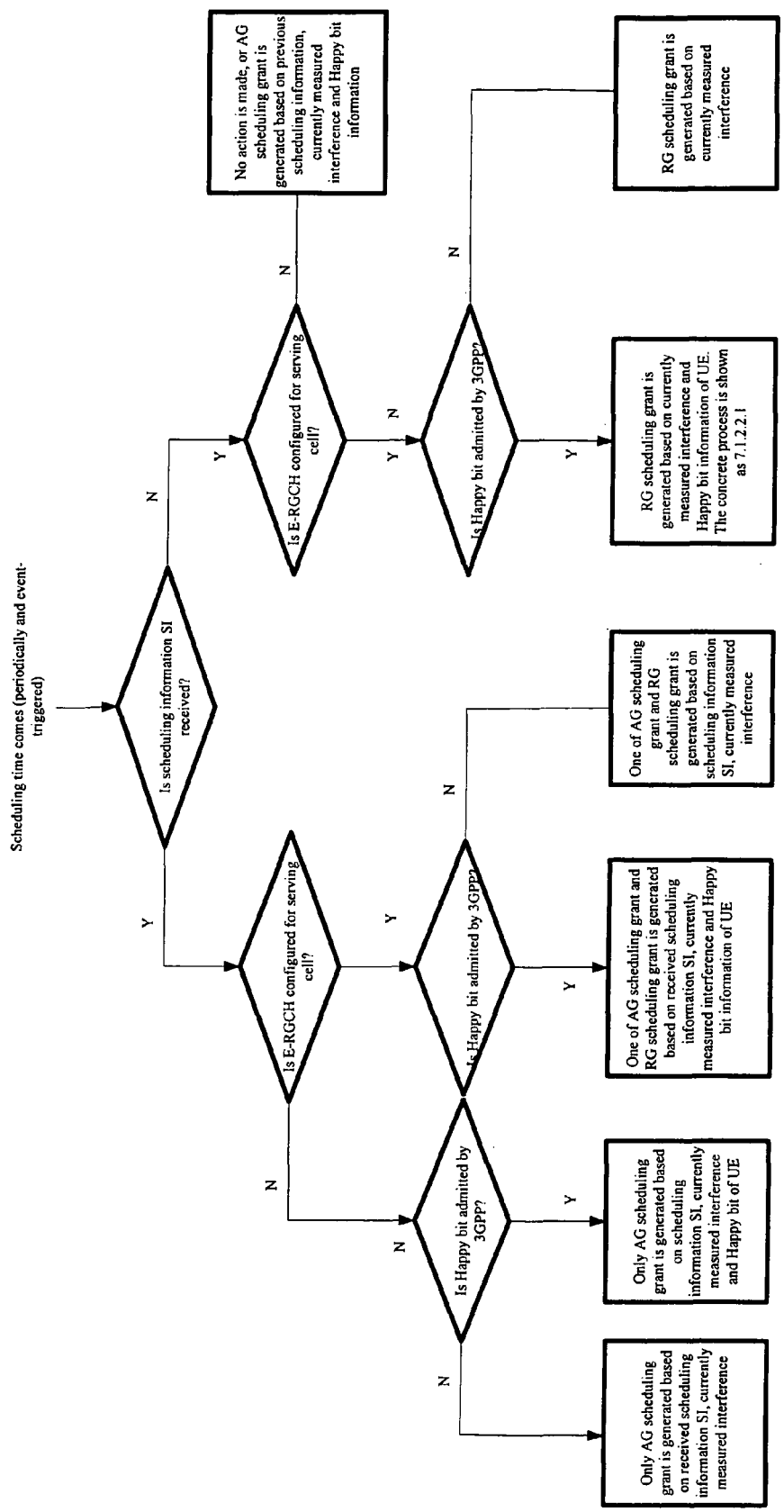
FIG. 2 is one of the present invention, i.e. a method for scheduling of a serving base station.

3a.2 The Case that the Serving Base Station does not Receive SI from the Terminal Referring to FIG. 2, scheduling information from the terminal is transmitted according to requirement, and interference measurement information ROT and Happy bit information from the terminal are available in each transmission period. For this feature, if the serving base station does not receive scheduling information from the terminal at a certain scheduling time, it generates different grants based on different configurations of cells.

3a.21 The Case that no E-RGCH is Configured for the Serving Cell

SRNC make a determination whether it assigns E-RGCH for transmitting RG grant to the cell based on results of network planning, so there are some cells having E-RGCH and some having no E-RGCH configured, but it is certain that E-AGCH is configured. For this feature, if no E-RGCH is configured for the cell and the scheduling process of the serving base station does not relate to the terminal, the serving base station does not generates any grants for the terminal, and if the scheduling process of the serving base station relates to the terminal, e.g. when resources for a certain terminal need to be decreased based on network status, the serving base station generates AG grant and transmits it to the terminal through the E-AGCH.

3a.22 The Case that E-RGCH Channel is Configured for the Serving Cell

SRNC make a determination whether it assigns E-RGCH for transmitting RG grant to the cell based on results of network planning, so there are some cells having E-RGCH and some having no E-RGCH configured, but it is certain that E-AGCH is configured. For this feature, if an E-RGCH is configured for the cell, the serving base station only generates $RG_S$ based on ROT information and Happy bit information.

There are two cases for generation of $RG_S$ based on whether the Happy bit is admitted:

3a.221; The Case without Happy Bit

Since Happy bit is being discussed by HSUPA Normalization Organization at present, it will be determined whether representation of Happy bit is used according to results of discussion. For this feature, if Happy bit is not admitted by the normalization organization, the present invention defines that $RG_S$ is generated based on current interference, according to function of the Relative Grant $RG_S$ of the serving base station and referring to definition of the Relative Grant $RG_N$ of the non-serving base station.

The SRNC configures parameters of threshold for the serving base station. The serving base station make corresponding decisions based on current-measured interference and threshold.

In $n_1$ successive transmission periods, if the interference measured by the serving base station is greater than Threshold 1, the serving base station generates DOWN RG;

In $n_2$ successive transmission periods, if the interference measured by the serving base station is less than Threshold 2, the serving base station generates UP RG;

In $n_3$ successive transmission periods, if the interference measured by the serving base station is between Threshold 1 and Threshold 2, the serving base station generates HOLD RG;

wherein the thresholds and $n_1$, $n_2$, $n_3$ is configured according to current network status, and can be reconfigured in a service transmission process.

3a.222 The Case with Happy Bit

Since Happy bit is being discussed by HSUPA Normalization Organization at present, it will be determined whether representation of Happy bit is used according to results of discussion. For this feature, if Happy bit is admitted by the normalization organization, since information carried in Happy bit is limited, it only has an effect on scheduling process of generating RG of the serving base station. Also, the Happy bit can only represent requirement for resources of a certain terminal user, and interference of the serving base station will have effects on transmission quality of all users controlled by the base station, so the priority of interference of the base station is higher than that of the Happy bit. Therefore, there is the following process of generating $RG_S$:

If the terminal user is satisfied with current occupation of resources, the serving base station generates RG scheduling grant according to process of 3a.221.

If the terminal user is not satisfied current occupation of resources, if the interference measured by the serving base station is greater than Threshold 1 in $n_1$ successive transmission periods, the serving base station generates DOWN RG;

if the interference measured by the serving base station is between Threshold 1 and Threshold 2, the serving base station generates RG scheduling grant based on information represented by the Happy bit.

III(B). The scheduling process of a non-serving base station: generation of RGN 3b.1 The Case that no E-RGCH is Configured Referring to FIG. 3, the non-serving base station can only generates RG scheduling grant based on current interference. SRNC configures parameters of threshold for the non-serving base station based on current network status. SRNC make a determination whether it assigns E-RGCH for transmitting RG grant to the cell based on results of network planning, so there are some cells having E-RGCH and some having no E-RGCH configured, but it is certain that E-AGCH is configured. For this feature, if no E-RGCH is configured for the cell, the non-serving base station does not perform any processing.

3b.2 The Case that E-RGCH Channel is Configured

Figure 3:
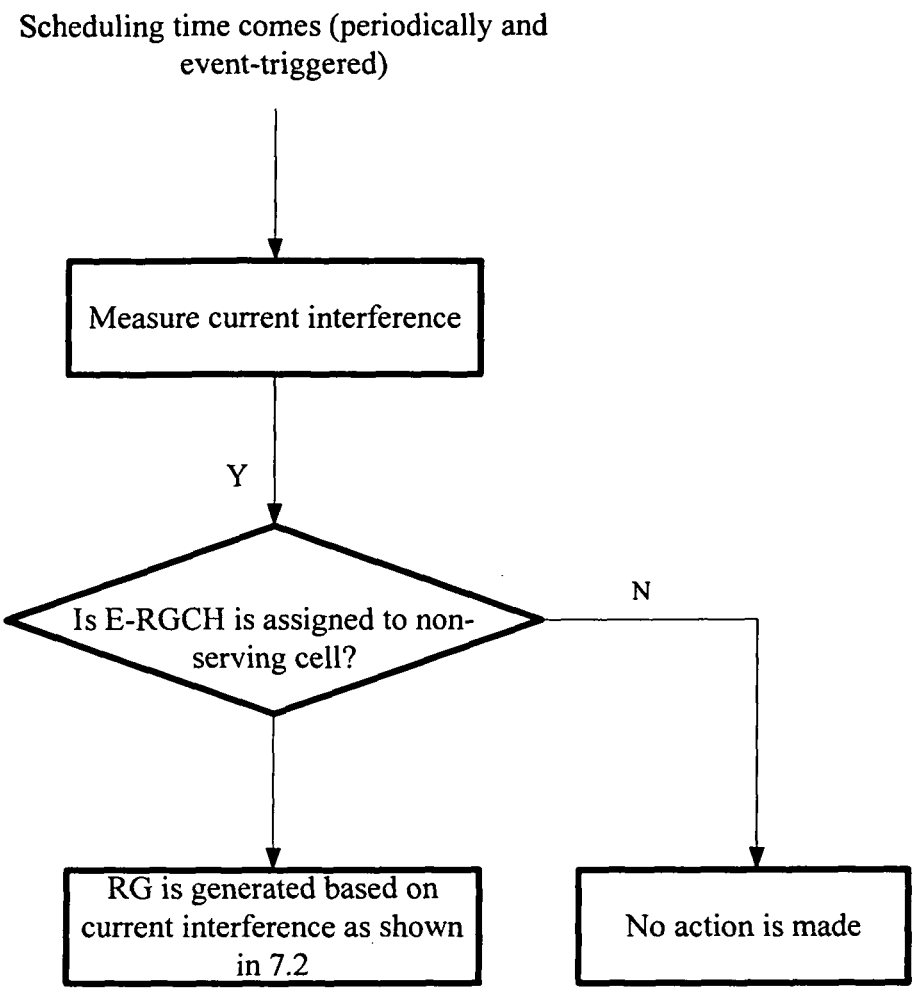
FIG. 3 is another one of the present invention, i.e. a method for scheduling of a non-serving base station.

Referring to FIG. 3, the non-serving base station can only generates RG scheduling grant based on current interference. SRNC configures parameters of threshold for the non-serving base station based on current network status. SRNC make a determination whether it assigns E-RGCH for transmitting RG grant to the cell based on results of network planning, so there are some cells having E-RGCH and some having no E-RGCH configured, but it is certain that E-AGCH is configured. For this feature, if an E-RGCH is configured for the cell, the non-serving base station generates RGN based on current interference and these thresholds:

in $n_4$ successive transmission periods, if the interference measured by the non-serving base station is greater than Threshold 4, the non-serving base station generates DOWN RG;

in $n_5$ successive transmission periods, if the interference measured by the non-serving base station is less than Threshold 5, the serving base station generates HOLD RG These thresholds can be reconfigured in the transmission process.

As shown in FIG. 1, the present invention provides a system for scheduling of a base station for HSUPA, comprising a transmitting module 10 in a terminal, a configuration module 20 in a SRNC and a measurement module 30 and a calculation module 40 in a base station, in which the calculation module 40 is connected to the transmitting module 10, the configuration module 20 and the measurement module 30 respectively, the transmitting module 10 is used by the terminal for transmitting information to the base station; the configuration module 20 is used by the SRNC for configuring parameters of associated threshold to the base station; the measurement module 30 is used by the base station for measuring current interference; the calculation module 40 is used by the base station for performing scheduling based on the current-obtained information.

The present invention proposes the following for the first time:

The serving base station generates AG or $RG_S$ based on SI, ROT, and Happy bit from a terminal user.

If SI information is not received and Happy bit is not admitted, it is proposed that $RG_S$ is based on interference of a serving base station.

If SI information is not received and Happy bit is admitted by 3GPP, only the serving base station performs processing on the Happy bit, which only has a effect on $RG_S$. That is, the serving base station generates a proper RG based on current interference and information carried in the Happy bit. If the current interference of the base station is inconsistent with information represented by the Happy bit, the priority of the interference is regarded as being higher, i.e. $RG_S$ is associated with the interference of the serving base station and the Happy bit information.

The present invention proposes a method for generating Relative Grant $RG_{S/N}$: SRNC configures associated parameters of threshold, the serving base station generates $RG_S$ based on these parameters in combination with current interference and Happy bit information of a terminal user, and the non-serving base station generates $RG_{N/S}$ based on these parameters of threshold and current interference.

The above embodiments of the present invention have been presented by way of example only, and not limitation. It should be noted that various changes and modifications could be made by those skilled in the art herein without departing from the sprit and scope of the invention. Therefore, all

The invention claimed is:

1. A method of scheduling a base station for High Speed Uplink Packet Access, wherein the base station generates a scheduling grant based on scheduling information and a currently measured interference value, wherein the base station generates the scheduling grant further based on a configured threshold and configured associated resource information and a dynamic control variable $E_t=T_{current}-T_{target}$, where $T_{target}$ is the resources required for a terminal user generated based on the scheduling information and the interference and $T_{current}$ is the actual current-used resources of the terminal user obtained according to transmission format information, wherein when $|Et|\geq E$, the scheduling grant is an Absolute Grant; otherwise, the scheduling grant is a Relative Grant, wherein E is the parameter of the base station configured threshold, wherein the base station sends the scheduling grant to user equipment (UE), wherein the base station generates a scheduling grant further based on a happy bit received from the terminal user, wherein $T_{target}$ is the resources required for the terminal user generated based on the scheduling information, the currently measured interference value and the happy bit received from the terminal user, wherein the base station is a serving base station during a soft-hand-over state, and wherein a non-serving base station generates a scheduling grant based on the currently measured interference value, the configured threshold and associated resource information.

2. The method of claim 1, wherein when the base station receives the scheduling information and the configured associated resource information is that no Enhanced-Relative Grant Channel is configured for a cell, the generated scheduling grant is an Absolute Grant.

3. The method of claim 1, wherein when the base station receives the scheduling information and the configured associated resource information is that an Enhanced-Relative Grant Channel is configured for a cell, the generated scheduling grant is one of an Absolute Grant and a Relative Grant.

4. The method of claim 1, wherein when the base station does not receive the scheduling information and the configured associated resource information is that no Enhanced-Relative Grant Channel is configured for a cell, the generated scheduling grant is an Absolute Grant or no scheduling grant is generated.

5. The method of claim 1, wherein when the base station does not receive the scheduling information and the configured associated resource information is that an Enhanced-Relative Grant Channel is configured for a cell, the generated scheduling grant: is a Relative Grant.

6. The method of claim 1, wherein when information represented by the happy bit of the terminal user is inconsistent with the interference information of the base station, the priority of the interference information is higher than that of the information represented by the happy bit of the terminal user.

7. The method of claim 1, wherein when the base station does not receive the scheduling information and the configured associated resource information is that an Enhanced-Relative Grant Channel is configured for a cell, the generated scheduling grant is a Relative Grant.

8. The method of claim 1, wherein when the configured associated resource information is that no Enhanced-Relative Grant Channel is configured for a cell, no scheduling grant is generated by the non-serving base station.

9. The method of claim 8, wherein when the configured associated resource information is that an Enhanced-Relative Grant Channel is configured for a cell, the scheduling grant generated by the non-serving base station is a Relative Grant.

10. A system for scheduling of a base station for High Speed Uplink packet Access, wherein the system comprises: a measurement module and a calculation module in a base station, wherein the calculation module is connected to a transmitting module of a terminal, a configuration module in a Serving Radio Network Controller, and the measurement module, respectively, the base station receiving scheduling information from the terminal via the transmitting module; the base station receiving a configured threshold from the configuration module, the measurement module measures current interference; the calculation module performs scheduling based on the scheduling information, wherein the base station is adapted to generate a scheduling grant based on the scheduling information, a currently measured interference value, the configured threshold, configured associated resource information and a dynamic control variable $E_t=T_{current} T_{target}$, where $T_{target}$ is the resources required for a terminal user generated based on the scheduling information and the current interference, and $T_{current}$ is the actual current-used resources of the terminal user obtained according to transmission format information, wherein when $|Et|\geq E$, the scheduling grant is an Absolute Grant; otherwise, the scheduling grant is a Relative Grant, wherein E is the parameter of the base station configured threshold, wherein the base station sends the scheduling grant to user equipment (UE), wherein the base station is adapted to generate a scheduling grant further based on a happy bit of the terminal user, wherein $T_{target}$ is the resources required for the terminal user generated based on the scheduling information, the current interference and the happy bit transmitted from the terminal user, wherein the base station is a serving base station during a soft-hand-over state, and wherein a non-serving base station is adapted to generate a scheduling grant based on the current interference, the configured threshold and associated resource information.

11. The system of claim 10, wherein when the base station receives the scheduling information and the configured associated resource information is that no Enhanced-Relative Grant Channel is configured for a cell, the generated scheduling grant is an Absolute Grant.

12. The system of claim 10, wherein when the base station receives the scheduling information and the configured associated resource information is that an Enhanced-Relative Grant Channel is configured for a cell, the generated scheduling grant is one of an Absolute Grant and a Relative Grant.

13. The system of claim 10, wherein when the base station does not receive the scheduling information and the configured associated resource information is that no Enhanced-Relative Grant Channel is configured for a cell, the generated scheduling grant is an Absolute Grant or no scheduling grant is generated.

14. The system of claim 10, wherein when the base station does not receive the scheduling information and the configured associated resource information is that an Enhanced-Relative Grant Channel is configured for a cell, the generated scheduling grant: is a Relative Grant.

15. The system of claim 10, wherein when information represented by the happy bit of the terminal user is inconsistent with the interference information of the base station, the priority of the interference information is higher than that of the information represented by the happy bit of the terminal user.

16. The system of claim 10, wherein when the base station does not receive the scheduling information and the configured associated resource information is that an Enhanced- Relative Grant Channel is configured for a cell, the generated scheduling grant is a Relative Grant.

17. The system of claim 10, wherein when the configured associated resource information is that no Enhanced-Relative Grant Channel is configured for a cell, no scheduling grant is generated by the non-serving base station.

18. The system of claim 17, wherein when the configured associated resource information is that an Enhanced-Relative Grant Channel is configured for a cell, the scheduling grant generated by the non-serving base station is a Relative Grant.

* * * * *